United States Patent [19]
Fioretto et al.

[11] Patent Number: 4,723,240
[45] Date of Patent: Feb. 2, 1988

[54] PCM-FRAME SYNCHRONIZING UNIT

[75] Inventors: Giorgio Fioretto; Ernesto Viale, both of Turin, Italy

[73] Assignee: SIP—Societa' Italiana Per L'Esercizio Telefonico P.A., Turin, Italy

[21] Appl. No.: 17,030

[22] Filed: Feb. 17, 1987

Related U.S. Application Data

[63] Continuation of Ser. No. 669,609, Nov. 8, 1984, abandoned.

[30] Foreign Application Priority Data

Nov. 17, 1983 [IT] Italy .............................. 068201 A/83

[51] Int. Cl.⁴ .............................................. H04N 5/04
[52] U.S. Cl. .................................... 370/100; 358/148; 375/118
[58] Field of Search ................ 370/100; 375/106, 107, 375/118; 379/53, 54; 358/148, 149, 85

[56] References Cited

U.S. PATENT DOCUMENTS 4,313,198  1/1982  Mazzocchi ........................... 370/100
4,429,386  1/1984  Graden ................................ 370/100

Primary Examiner—James J. Groody
Assistant Examiner—David E. Harvey
Attorney, Agent, or Firm—Karl F. Ross; Herbert Dubno

[57] ABSTRACT

The unit is capable of synchronizing an incoming PCM frame with a PCM frame to be presented at the output, to ensure the sequencing of the channels belonging to a wide-band information flow. The flow can consist of a coded video-signal coming from a video-conference room. The synchronization is accomplished by suitable writing and reading operations effected in a random access memory (RAM) apt to store the information contents of two PCM frames. FIG. 2 is the most significant.

4 Claims, 4 Drawing Figures

PCM-FRAME SYNCHRONIZING UNIT

This is a continuation of application Ser. No. 669,609 filed on Nov. 8, 1984, now abandoned.

FIELD OF THE INVENTION

The present invention concerns the apparatuses for the telepone switching of digital signals and more particularly it relates to a PCM-frame synchronizing unit.

BACKGROUND OF THE INVENTION

When switching wide-band information flows transmitted on a 2.048 Mbit/s PCM group, one of the technical problems to cope with is that of keeping the sequencing of the individual channels of a frame while passing through a time switching stage. In particular, a certain channel sequence of a frame at the switching stage input is required to be maintained equal in the outgoing frame too. Which is obtained today only for the bits of each channel, as far as 64 kbit/s PCM channel switching is concerned.

On the contrary it would be useful to obtain also a sequencing of the individual channels, in order to ensure the correct switching of signals occupying more than one channel e.g. signals derived from video-signal coding equipment.

In said case it is compulsory to maintain the correct time succession of all the individual channels forming the outgoing information flow, to correctly recover the TV image received.

Nowadays logic circuits capable of recognizing the individual frame numbers and, inside the frames, the individual channel numbers are already known. Said circuits are elements necessary to a frame synchronizer, as they supply the initial data for the maintenance of the flow sequencing.

However, said circuits cannot intervene to carry out the required synchronisation.

OBJECT OF THE INVENTION

The synchronizing unit described hereinafter allows the implemenation of a switching node for wide-band digital flow at transmission rates multiple of 64 kbit/s, as it ensures PCM flow sequencing at the output of the time switching stage.

SUMMARY OF THE INVENTION

The present invention provides a PCM-frame synchronizing unit, apt to synchronize an incoming PCM frame with a PCM frame to be presented at the output, furnished with timing and synchronism signals, to ensure the sequencing of the channels belonging to a wide-band information flow, which comprises:

a first frequency divider, which, in function of the timing and synchronism signals associated with incoming PCM frame, emits:

- a signal and its complement, which indicate if the channel received is odd or even, for the control of said first and second registers;
- a signal representing the incoming channel number and frame type;
- a signal of completed reception of an incoming channel octet;
- a signal of PCM frame beginning;
- a signal indicating that the octet of the incoming channel is available;

a secondary frequency divider, which, in function of the timing and synchronism signals the incoming PCM frame is to be synchronized with, emits:

- a signal and its complement, which, indicated if the channel to be presented at the output is even or odd;
- a signal representing the channel number to be presented at the output;
- three pulse signals, wiht a frequency twice as high as the channel frequency and mutually out of phase;
- a signal indicating the beginning of PCM frame to be presented at the output;
- a first signal with frequency equal to half the channel frequency;
- a second signal, which has a frequency equal to half the channel frequency and is out of phase by a time-slot in comparison with that first signal;
- a first multiplexer, capable of extracting the channel contents supplied by said first or second register upon command of said signals, which indicate if the channel received is odd or even, and upon reception of an enabling signal;
- a second multiplexer, apt to extract the signals representing the numbers of the incoming channels to be presented at the output upon command of a switching signal;
- a random-access memory subdivided into two parts, whose data input is connected to the output of said first mulitplexer, the address input is connected to the output of said second multiplexer, while the input for enabling writing, the input for switching one of the two parts during the writing, the input for enabling output data and the input for switching one of the two parts during the reading are connected to a logic circuit;
- a third and fourth registers, apt to alternately and sequentially memorize PCM channel contents supplied by random-access memory, said registers being controlled by said signals which indicate if the channel to be presented a the output is even or odd and being enabled to the storage of said first and second signals having a frequency equal to half the channel frequency;
- said logic circuit apt to control said multiplexers and said random-access memory, in function of the signals received from said frequency dividers and of the timing signal of the incoming frame.

BRIEF DESCRIPTION OF THE DRAWINGS

The foregoing and other characteristics of the present invention will be made clearer by the following description of a preferred embodiment thereof, given by way of examples and not in limiting sense, and by the annexed drawings in which.

SPECIFIC DESCRIPTION

In the following description reference will be made to the particular case in which some PCM-frame synchronising units US1, US2, US3 are inserted into a multivideoconference switching unit, shown in the block diagram of FIG. 1.

As known, a multivideo conference system allows image, speech and other signal transmission to permit the communication among distant people, staying at two or more different places. A videoconference system basically consists of some equipped rooms, where there are both the lecturers and the equipment for information collection and regeneration, and of the switching unit apt to send the information towards the other rooms connected. The video information, coming from a room or from another switching unit, is PCM coded with a 2.048 Mbit/s rate, while speech information and signalling present proportionally lower rates.

Figure 1:
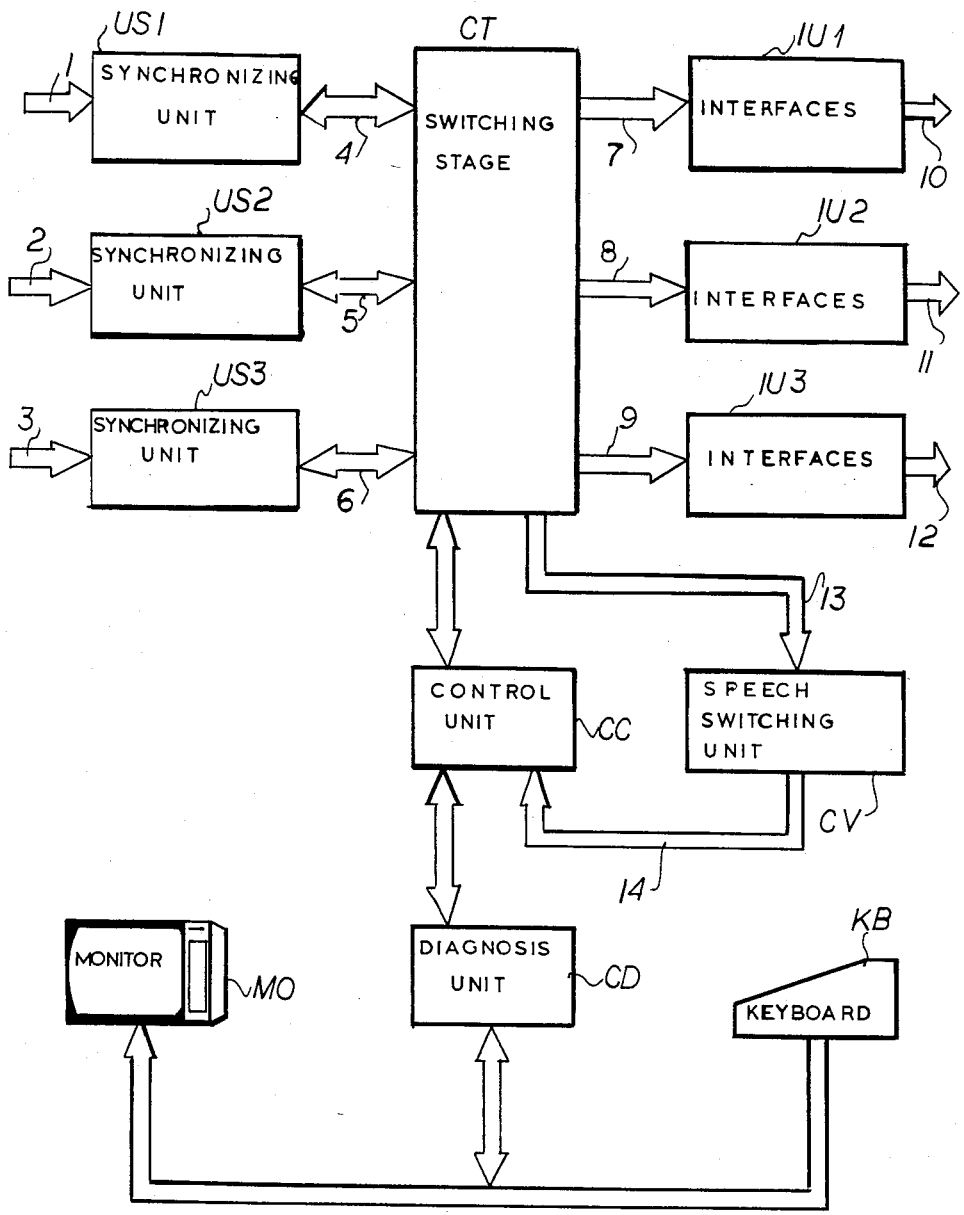
FIG. 1 is a block diagram of a video-conference switching unit.

In FIG. 1 US1, US2, US3 denote three synchronizing units, of the kind provided by the present invention, which receive 2.048 Mbit/s PCM flows coming through connections 1, 2 and 3 from video-conference rooms. By bidirectional connections 4, 5 and 6 the outgoing flows are lead to a time switching stage CT and synchronism and timing signals of stage CT are sent to synchronizing units US1, US2, US3.

CT is in turn connected with output interfaces IU1, IU2 and IU3 by connections 7, 8 and 9.

Duly switched flows are then sent back to videoconference rooms through connections 10, 11 and 12.

Control unit CC controls various room switching according to automatic criteria based on the sound level or according to request criteria coming from the people present.

Speed switching unit CV sequentially receives through connection 13 speech channels coming from the rooms and detects the speaker channel whose sound levels preminent. This information supplied through connection 14 to control unit CC, allows switching operations provided by the automatic criterion to be carried out.

The switching unit is complete by a diagnosis unit CD, which effects suitable checks on the operation and detects possible anomalies, both inside each block and in the data exchange among individual blocks.

The diagnosis unit is accessed by a keyboard KB and test results are displayed on monitor MO.

Figure 2:
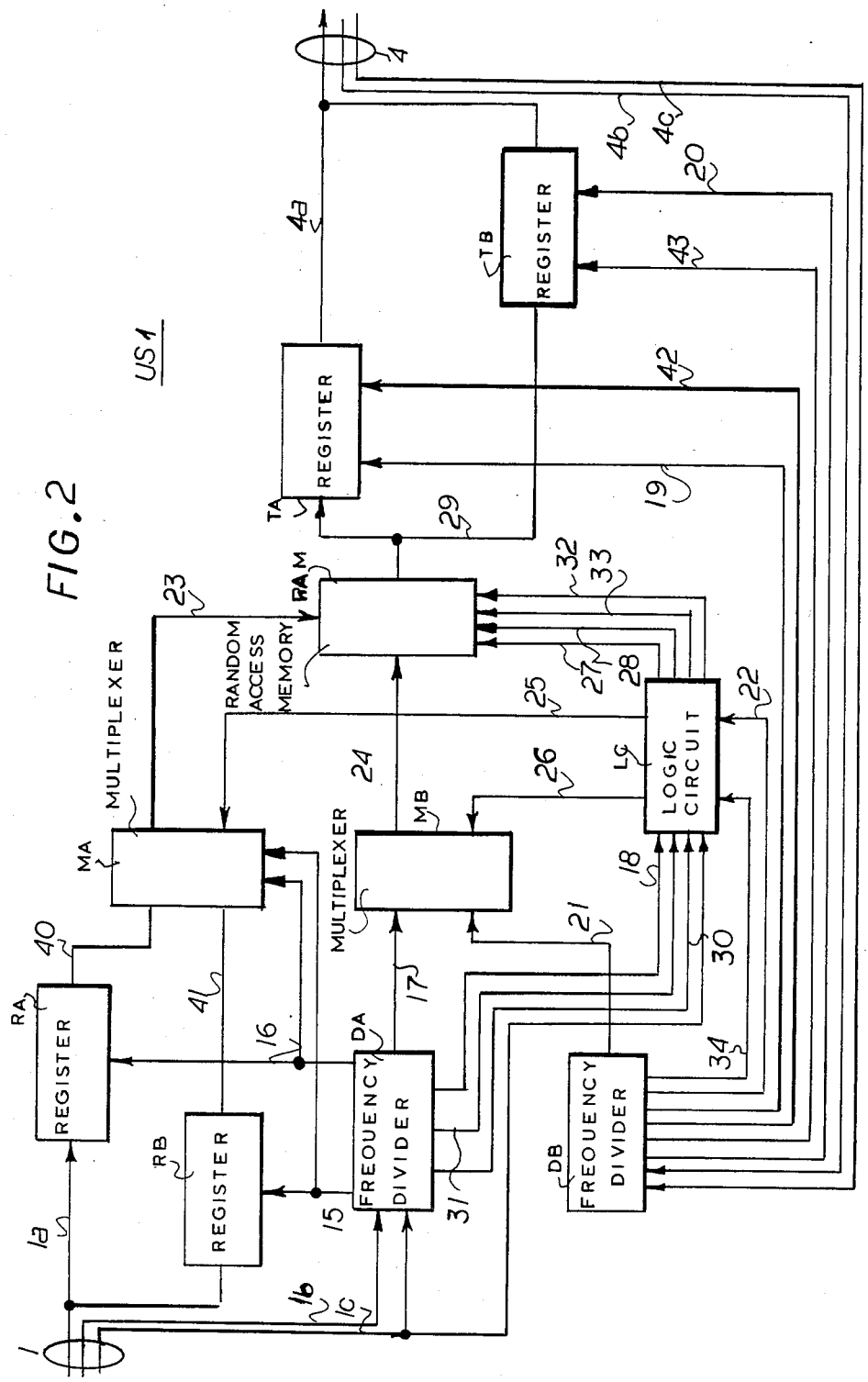
FIG. 2 is a block diagram of a PCM-frame synchronizing unit, according to the invention, denoted by US1 in FIG. 1.

An individual synchronizing unit, e.g. US1 is depicted in the block diagram of FIG. 2.

References 1 and 4 denote also input and output connections. More particularly, connection 1a carries incoming wide-band data flow connection 1b incoming data timing and connection 1c frame synchronization, consisting of a signal present for the whole duration of PCM frame of type A.

Connection 4a carries the outgoing data flow to be sent to the switching stage, and connections 4b and 4c carry outgoing data timing and synchronism; the last two signals are supplied by the switching stage.

Timing signals, present on wire 1b, and synchronism signals, present on wire 1c, access a frequency divider DA, which determines the channel sequence of each frame. Wire 1c indicates the timing of the incoming frame, where logic level 1 corresponds to frame A and logic level 0 correponds to frame B. Frequency divider DA supplying at the output on wires 15 and 16 signals indicating if the channel number present at the instant is odd or even and on connection 17 the very number of the channel and frame (frame A or B) it belongs to. Wire 16 indicates the enabling register RA of odd channels, where logic level 1 determines data storage. Wire 15 indicates the enabling of register RB of even channels. Wire 17 indicates the number of the incoming channel. Complete reception of data belonging to a channel is signaled on wire 18, the frame beginning on wire 30 and received data availability on wire 31. Wire 18 indicates the complete data reception from a channel. Wire 30 indicates the time phase of the signal detecting the incoming frame. Wire 31 indicates the signal supplied by frequency divider DA for the writing command in memory.

Analogously frequency divider DB supplied on wires 19 and 20 signals indicating if the channel number to present at the output is odd or even, on wires 42 and 43 the command of blocks TA and TB and on connection 21 the very number of the channel, obtaining said information from signals coming from the switching stage over wires 4b and 4c.

Finally, timing signals, necessary to the operation of a logic circuit LC are sent over connection 22 and wire 34;

References RA and RB denote two registers capable of alternately storing the contents of an incoming channel over wire 1a, upon command of the signals present on the already described wires 15 and 16, respectively.

MA denotes a multiplexer apt to extract the data supplied by register RA or RB, upon command of the signals present on wires 15 and 16. MA is enabled to extract data by a signal supplied by logic circuit LC through wire 25.

MB denotes a multiplexer apt to extract the numbers of incoming or outgoing channels supplied by frequency divider DA or DB, upon command of the switching signal coming from logic circuit LC through wire 26.

MA supplies on wire 23 input data for a random-access memory RAM, and MB supplies on wire 24 the channel numbers, used as writing and reading addresses for memory RAM, apt to memorise two PCM frames.

This memory is subdivided into two parts, each consisting of 32 octets and assigned to the storage of data belonging to frame A or frame B. Reading and writing operations are effected upon command of the logic circuit LC through wires 27, 28, 32 and 33.

Data outgoing on connection 29 are sent to two registers TA and TB, alternately controlled through wires 19, 20, 42, 43 coming from frequency divider DB. Data outgoing from TA or TB are finally sent to the switching stage through connection 4a.

Figure 3:
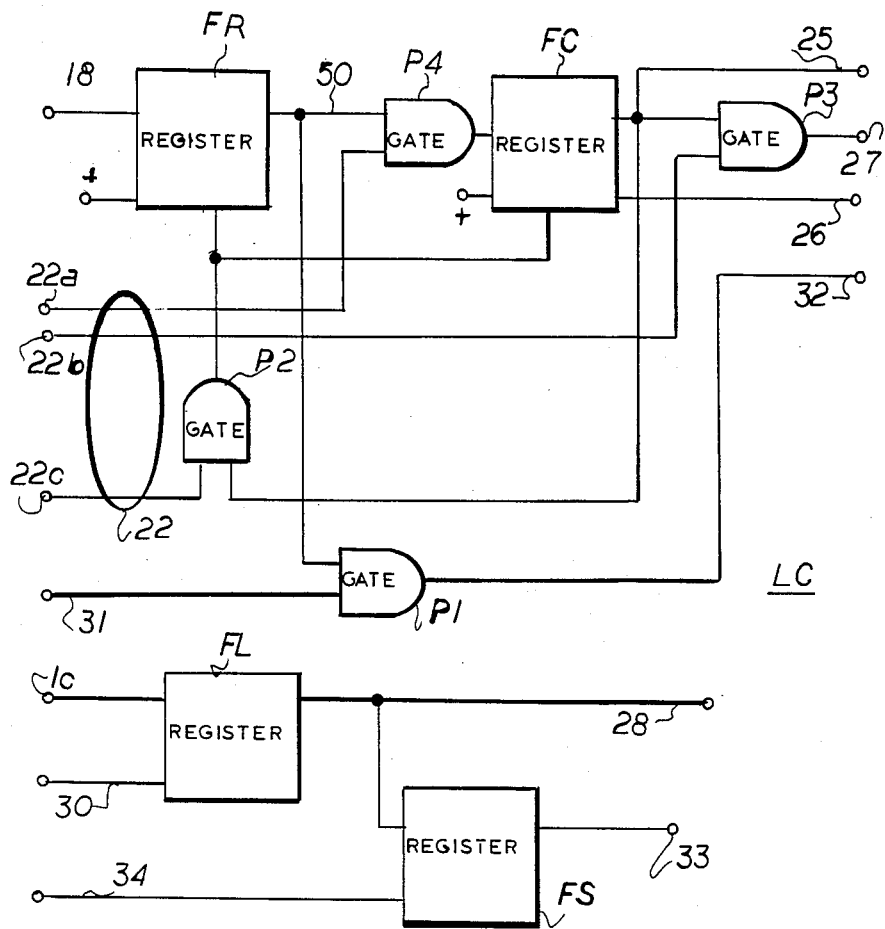
FIG. 3 is a detailed block diagram of the block denoted by LC in FIG. 2.

Logic circuit LC is represented in more details on the block diagram of FIG. 3.

LC comprises two different circuits, the one at the top is designed to identify the time phase in which the writing operations of the octets of the incoming channels and writing operations of the octets of the outgoing channels are to be effected, the circuit at the bottom supplies the data on the part of the memory where writing or reading are to be carried out.

The ways of writing in the memory an octet of an incoming channel are now going to be described. When an octet is present in register RA or RB, frequency divider DA sends a signal on wire 18. This signal, which indicates the octet reception end, is stored in a register FR, in this way circuit LC is informed that the arriving octet has been completely written in register RA or RB.

The octet can then be stored in memory RAM at the channel address received through connection 24 and multiplexer MB from frequency divider DA, controlled by input signals 1b and 1c. These signals, in phase with input PCM frame, allow frequency divider DA to detect inside the frame the time position of the octet to be stored. This position is expressed as a binary number, used as an address of memory RAM where the octet is to be stored.

At this point the octet can be transferred to memory RAM, when enabled to writing by the signal on wire 32, received through gate P1 from frequency divider DA on wire 31.

The memory part, where the writing is to be effected is determined by a register FL, which stores through a signal on wire 30 the logic state present on wire 1c. A signal, whose logic level identifies either part of memory RAM, is then available at the output, connected to wire 28. As to the reading, it is always effected in the part of memory other than that where the writing is in progress.

The reading of an output channel octet to be stored in registers TA or TB, is determined by frequency divider DB by connection 21, and timing signals present on connection 22. This connection comprises three wires 22a, 22b and 22c, trasversed by pulses at a frequency which is twice as high as the channel frequency and with suitable phase relations.

The information previously stored in FR is transferred through wire 50 and gate P4, during the time phase in which the signal on wire 22a is at high logic value, to a register FC. The signal outgoing from FC on wire 26 determines the positioning of multiplexer MB to extract channel numbers supplied by DB. By the signal outgoing on wire 25, FC inhibits multiplexer MA and by the signal sent through gate P3 on wire 27 enables data output from the memory.

P3 is controlled by the signal on wire 22b. By the signal on wire 22c and through gate P2, controlled by the signal outgoing from register FC, the two registers FR and FC are then reset and can start the subsequent reading and writing cycle. By the signal over wire 33, outgoing from FS, the part of memory where reading operations are effected, is detected. To this aim register FS is controlled by the signal present on wire 34, which carries the indication of the beginining of the outgoing frame, supplied by the switching stage and by the signal present on wire 28, already described.

Figure 4:
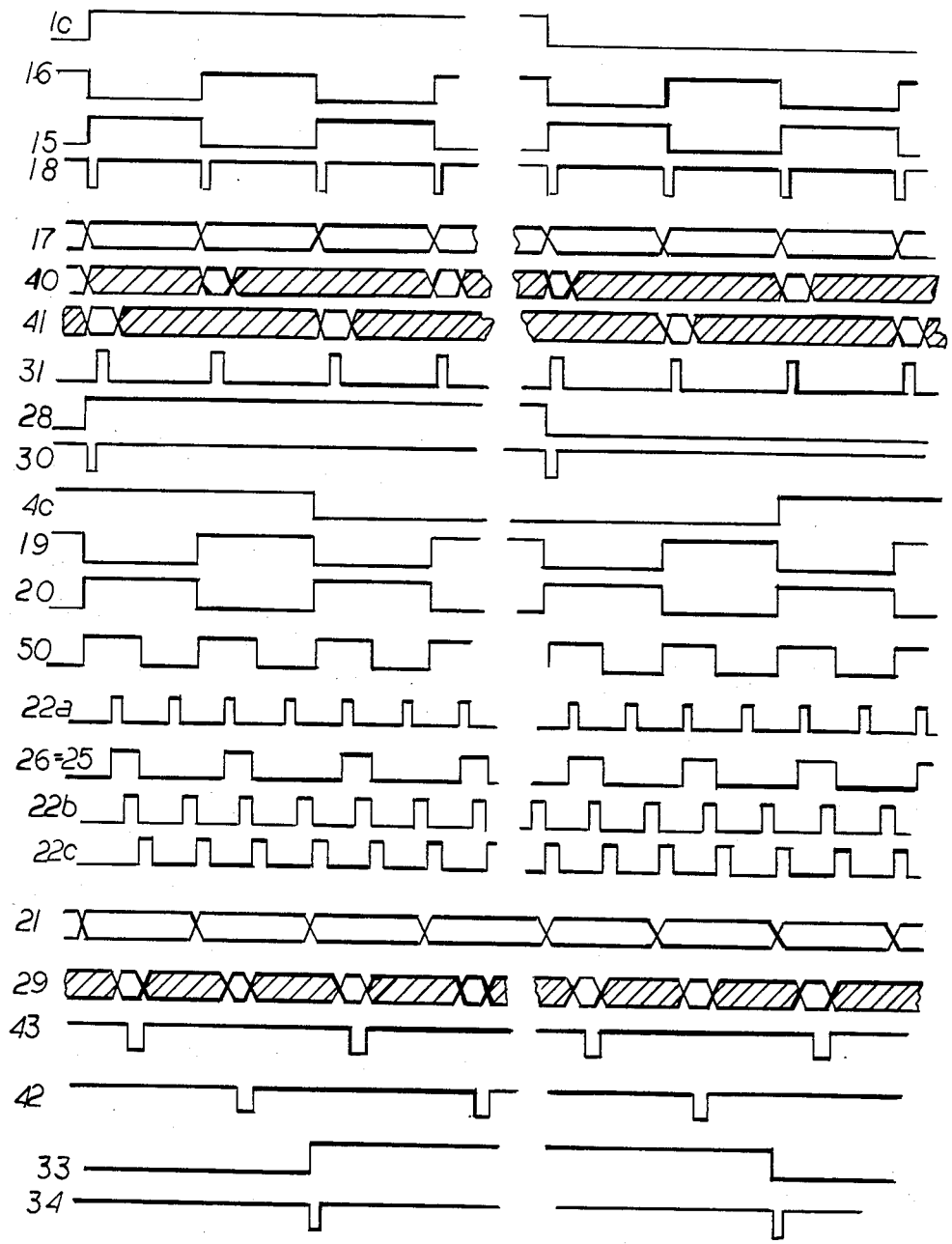
FIG. 4 is a frame diagram of the signals present at the main points of the diagrams of FIGS. 2 and 3.

To make it clearer, FIG. 4 shows the waveforms of the signals present at the main points of the block diagrams of FIGS. 2 and 3. Each waveform is denoted by the same number as that of the wire on which it appears. More particularly:

1c indicates the timing of the incoming frame, where logic level 1 corresponds to frame A and logic level 0 corresponds to frame B;

16 indicates the enabling of register RA (FIG. 2) of odd channels, where logic level 1 determines data storage;

15 indicates the enabling of register RB of even channels;

18 indicates the complete data reception from a channel;

17 indicates the number of the incoming channel, coded by 5 bits;

40 indicates the time phase in which the data of even channels are present at the input of multiplexer MA; the non-dashed part corresponds to the period in which data are valid;

41 indicates the time phase in which the data of odd channels are present at the input of multiplexer MA;

31 indicates the signal supplied by frequency divider DA for the writing command in the memory;

28 indicates the signal on the command wire which determines the use of either memory part during writing in function of the state of the signals on wires 1c and 30 stored in register FL of circuit LC (FIG. 3);

30 indicates the time phase of the signal detecting the incoming frame beginning;

4c indicates the frame timing of time switching stage CT (FIG. 1), here supposed to present a phase lead with respect to incoming timing 1c;

19 indicates the enabling of register TA (FIG. 2) of odd channels;

20 indicates the enabling of register TB of even channels;

50 indicates the time phase of the reading request determined by register FR of circuit LC (FIG. 3) in function of the complete channel data reception (signal 18) and of the occurred data recording in memory RAM (FIG. 2) by signal 32;

22a indicates the beginning of a time phase assigned to the reading in memory RAM (FIG. 2); the relevant transition is stored in register FC through gate P4 (FIG. 3);

25 indicates the phase of the signal which enables or inhibits multiplexer MA (FIG. 2) in correspondence with logic level 1 or 0, respectively; the outgoing signal on wire 26 is its complementary signal (25=$\overline{26}$) and is used to position multiplexer MB (FIG. 2) so as to supply on wire 24 the number of the outgoing channel received from frequency divider DB or the number of the incoming channel received from frequency divider DA, in correspondence with logic level 1 or 0 respectively;

22b indicates the time phase of the signal, which, through gate P3 (FIG. 3), supplies on wire 27 (FIG. 2) memory RAM with enabling to the reading;

2c indicates the time phase of the signal which stops the reading phase, by resetting through gate P2 (FIG. 3) registers FR (FIG. 3) and FC;

21 indicates the outgoing channel number;

29 indicates the time phase, in which the data supplied by memory RAM (FIG. 2) on wire 29 are available in registers TA, TB; the data result valid in the non-dashed part;

43 denotes the control signal of register TB for storing the data supplied by memory RAM on connection 29;

42 indicates the control signal of register TA for storing the data supplied by the memory RAM on connection 29; said signal, as that denoted by 43, has a frequency equal to half the channel frequency;

33 indicates the signal which determines the use of either part of the memory during writing in function of the state of the signal on wire 28 (FIG. 3), outgoing from register FL; the transition takes place in correspondence with the return to zero of frame beginning signal, present on wire 34 at the output of frequency divider DA;

34 indicates the time phase of the signal, which identifies the outgoing frame beginning.

It is clear that what described has been given only by way of non limiting example. Variations and modifications to the above embodiments may of course be made without departing from the scope of the invention.

We claim:

1. PCM-frame synhronizing unit for synchronizing a plurality of incoming PCM frames of different channels into an output signal for a switching stage, each of said incoming PCM frames having a first reference timing signal and a first reference synchronizing signal, said switching stage having a second reference timing signal and a second reference synchronizing signal, said unit comprising:

a first memory means being coupled to said incoming PCM frames;

a second memory means being coupled to said incoming PCM frames;

a first frequency divider, being coupled to said incoming PCM frames, said first memory means, said second memory means, said first reference timing signal and first reference synchronizing signal, whereby said first frequency divider emits:

a first signal to enable writing of said first memory means if one of said channels is odd, a first complement signal to enable writing of said second memory means if one of said channels is even, a second signal representing incoming type of each of said PCM frames, a third signal indicating completed reception by said synchronizing unit of each of said channels, and a fourth signal indicating start of each of said PCM frames;

a first multiplexer coupled to said first frequency divider, said first memory means and said second memory means for extracting contents of said first and second memory means;

a third memory means coupled to said switching stage;

a fourth memory means coupled to said switching stage;

a second frequency divider coupled to said third memory means, said fourth memory means, said second reference timing signal and said second reference synchronizing signal, whereby said first frequency divider emits:

a fifth signal to enable writing of said third memory means if one of said channels is odd, a second complement signal to enable writing of said fourth memory means if one of said channels is even, a second multiplexer coupled to said first frequency divider and said second frequency divider for extracting signals representing a number of one of said channels;

a fifth memory means, wherein input of said fifth memory means being coupled to said first multiplexer and said second multiplexer, and wherein output of said fifth memory means being coupled to said third memory means and said fourth memory means; and a logic circuit coupled to said fifth memory means, said first multiplexer, said second multiplexer, said first frequency divider, and said second frequency divider, and said second frequency divider, for emitting an enabling signal for enabling said first multiplexer and a switching signal for enabling said second multiplexer and for enabling reading and writing of said fifth memory means in response to said first and said second frequency dividers and said first reference timing signals.

2. A PCM-frame synchronizing unit as defined in claim 1, wherein said second frequency divider further emits three pulse signals with each of said pulse signals having a frequency being twice frequency of said channels and being mutually out of phase, said logic circuit comprises:

a sixth memory means for storing said third signal;

a first gate coupled to said sixth memory means;

a seventh memory means coupled to said first gate, wherein said third signal being stored in said seventh memory means when said first gate being enabled by first of said three pulse signals, output of said seventh memory means forming said enabling signal and said switching signal;

a second gate coupled to said seventh memory means and said fifth memory means, to enable reading of said fifth memory means when enabled by a second of a second of said three pulse signals;

a third gate coupled to said sixth and seventh memory means to reset contents of said sixth memory means when said seventh memory means and a third of said three pulse signals are simultaneously at a high level; and a fourth gate coupled to said sixth memory means and said first frequency divider to enable writing of said fifth memory means.

3. A PCM synchronizing unit as defined in claim 2, further comprising:

an eighth memory means coupled to said first reference synchronizing signal, said first frequency divider, and said fifth memory means, to enable writing of said fifth memory means a ninth memory means coupled to said second frequency divider, said fifth memory means and said eighth memory means to enable reading of said fifth memory means.

4. A PCM synchronizing unit as defined in claim 3 wherein said fifth memory means stores two of said PCM frames.

* * * * *